United States Patent [19]

Nelson

[11] Patent Number: 5,058,533

[45] Date of Patent: Oct. 22, 1991

[54] ANIMAL ATTRACTING LITTER

[76] Inventor: Thomas E. Nelson, 3614 Montrose, Suite 906, Houston, Tex. 77006

[21] Appl. No.: 464,657

[22] Filed: Jan. 11, 1990

Related U.S. Application Data

[63] Continuation-in-part of Ser. No. 224,426, Jul. 25, 1988, abandoned, which is a continuation-in-part of Ser. No. 940,902, Dec. 10, 1986, abandoned.

[51] Int. Cl.$^5$ .............................................. A01K 1/015
[52] U.S. Cl. ..................................................... 119/173
[58] Field of Search .......................... 119/1, 29, 29.5; 106/218, 236; 424/196.1

[56] References Cited

U.S. PATENT DOCUMENTS

| | | | |
|---|---|---|---|
| 281,521 | 7/1883 | Kingzett et al. | 424/196.1 |
| 2,671,927 | 3/1954 | Fell | 119/1 |
| 3,227,138 | 1/1966 | Campbell | 119/1 |
| 3,286,691 | 11/1966 | McFadden | 119/1 |
| 3,390,046 | 6/1968 | McDavid | 106/218 |
| 3,626,899 | 12/1971 | Spellman | 119/1 |
| 3,735,734 | 5/1973 | Pierce, III et al. | 119/1 |
| 3,941,090 | 3/1976 | Fry | 119/1 |
| 3,983,842 | 10/1976 | Marion et al. | 119/1 |
| 4,009,684 | 3/1977 | Kliment et al. | 119/1 |
| 4,085,704 | 4/1978 | Frazier | 119/1 |
| 4,203,388 | 5/1980 | Cortigene et al. | 119/1 |
| 4,263,873 | 4/1981 | Christianson | 119/1 |
| 4,407,231 | 10/1983 | Colborne et al. | 119/1 |
| 4,459,368 | 7/1984 | Jaffee et al. | 119/1 |
| 4,494,482 | 1/1985 | Arnold | 119/1 |

FOREIGN PATENT DOCUMENTS

| | | | |
|---|---|---|---|
| 2940093 | 4/1982 | Fed. Rep. of Germany | 119/1 |
| 0687719 | 2/1953 | United Kingdom | 119/1 |

OTHER PUBLICATIONS

Handbook of Chemical Synonyms and Tradenames by W. Gardner, et al.
Webster's Third New International Dictionary of the English Language.
The Merck Index, 10th Edition (1983).
Data Sheet of "N" Rosin Oil (Natrochem, Inc.).
Polymers and Resins (Their Chemistry and Chemical Engineering) by Brage Golding, pp. 152-155.

*Primary Examiner*—Robert P. Swiatek
*Assistant Examiner*—Todd E. Manahan
*Attorney, Agent, or Firm*—A. Triantaphyllis

[57] ABSTRACT

An animal litter capable of attracting animals comprising litter material mixed with a rosin oil and a method of preparing same.

21 Claims, No Drawings

ANIMAL ATTRACTING LITTER

RELATED APPLICATIONS

This is a continuation-in-part application of U.S. patent application Ser. No. 07/224,426, filed on July 25, 1988, now abandoned, which was a continuation-in-part application of U.S. patent application Ser. No. 06/940,902, filed on Dec. 10, 1986, now abandoned.

TECHNICAL FIELD

The present invention relates to an animal litter and, more particularly, to an animal litter with a chemical substance that attracts the animal to the litter. Still more particularly, the present invention relates to an animal litter containing a rosin oil that causes the animal to be attracted to the litter.

BACKGROUND OF THE INVENTION

Animal litter and animal litter additives are well known in the art. U.S. Pat. No. 3,735,734 discloses a mixture of an absorbant soil and an odor-inhibiting additive. The soil is clay or diatomaceous earth and the deodorizing additive is chlorophyl, sodium dihydrogen phosphate, potassium dihydrogen phosphate, potassium acid phthalate, or a combination of these.

U.S. Pat. No. 3,983,842 discloses an animal litter comprised of peanut hulls and sodium bicarbonate as odor suppressor.

U.S. Pat. No. 4,009,684 discloses an animal litter comprised of a loose substrate treated with a solid water-soluble copolymer. A fragrance or deodorizer was added.

U.S. Pat. No. 4,203,388 discloses an animal litter prepared by dewatering rejects of a secondary fiber plant incorporating an odor suppressor such as sodium bicarbonate. The rejects are pelletized and dried to form the litter.

U.S. Pat. No. 4,494,482 discloses a solid absorbant material having absorbed thereto a halogenated aromatic hydrocarbon bacteriostat to retard the development of urine odors.

U.S. Pat. No. 4,459,368 discloses a particulate, water- and oil-absorbing composition containing absorbent fillers, earth clay particles and absorbent synthetic particles, e.g. calcium sulfate dihydrate-containing granules.

Oftentimes, habit alone is not sufficient to attract an animal seeking a place to defecate and/or urinate to a particular location in which the animal litter is situated. One disadvantage of the patents hereinabove is that the animal litter disclosed and the additives thereto do not attract the animal to this particular location. Another disadvantage is that litter materials mixed with additives are difficult to handle, especially in the presence of urine and feces.

U.S. Pat. Nos. 3,286,691 and 4,263,873 disclose animal litter containing material that attracts the animal to the litter. More particularly, U.S. Pat. No. 3,286,691 discloses litter comprised of a particulate, compressed, chlorophyl-containing grass material that readily absorbs liquids. Although the patent alleges that the material has its own natural odor which is an attraction to animals, that material is not specifically described or claimed. Therefore, it is unclear as to what material acts as the attractant to the animal.

U.S. Pat. No. 4,263,873 discloses an animal litter comprised of a cellulose litter material that contains a pheromonelike attractant substance to attract the animal seeking a place to defecate and/or urinate.

Although the latter patents disclose the use of an attractant, none of those patents disclose the use of rosin oil as such an attractant. Furthermore, none of the prior art patents disclose the use of rosin oil as an attractant together with a calcined or a partially calcined sorbitive clay mineral material or a mixture of materials containing sorbitive clay mineral material capable of absorbing the urine and of retarding the decomposition thereof to noxious substances for several days.

These and other objects and advantages of the present invention will become readily apparent from the following description.

SUMMARY OF THE INVENTION

The present invention discloses the use of a rosin oil as an animal attractant for an animal seeking a place to defecate and/or urinate. The rosin oil is dissolved in deodorized kerosene and is mixed with animal litter which is, in the case of cat litter, preferably any calcined sorbitive clay mineral material or mixture of materials containing a absorbtive clay mineral material.

The rosin oil is a product obtained from rosin. The rosin oil contains an ingredient or ingredients that attract the animal to that particular location, thereby allowing one to better utilize animal litter. The preferred animal litter completely absorbs the urine and prevents the decomposition of its components and the subsequent generation of unpleasant odors for several days.

DESCRIPTION OF THE PREFERRED EMBODIMENT

Accordingly, an animal litter is disclosed containing litter material and a rosin oil that attracts the animals to the animal litter. Therefore, when the animal seeks a place to defecate and/or urinate, it is attracted to the animal litter whereby defecation and/or urination in places other than in the litter is prevented. The rosin oil used in the present invention, otherwise known as rosinol or retinol, is obtained from rosin. Rosin oil is usually used in lithographic and printing applications. While rosin oil obtained from the dry distillation of rosin could be used to practice the invention, it is preferred that a pure rosin oil formulated from selected components produced by thermal decarboxylation of rosin be used. An example of such rosin oil is rosin oil manufactured by Natrochem, Inc. and marketed as "N" Rosin Oil. The specifications of that product are shown on Table I.

TABLE I

| Specifications of "N" Rosin Oil | |
|---|---|
| Acid Number: | 60 to 90 |
| Specific Gravity at 60° F.: | 0.98 to 1.02 |
| Viscosity SUS at 210° F.: | 95 to 130 |
| Loss in Heating, Percent Max.: | 5.0 |
| Ash, Percent Max.: | 0.3 |
| Color, Coal Tar Max.: | 6 |

Because rosin is primarily comprised of isomers of abietic acid, the primary component of the rosin oil in question includes abietic acid and, more particularly, decarboxylated abietic acid.

The rosin oil being produced by the dry distillation of rosin has a boiling point above 280° C. This and other information relating to such rosin can be found in the Merck Index (10th Edition), Monograph Number 8135, which is incorporated herein by reference.

The rosin oil in question is a viscous material. Therefore, while one could practice the present invention by utilizing rosin oil alone to disperse on the animal litter, it is preferred that rosin oil be dissolved in an appropriate organic solvent for better handling and dispersion thereof and for preventing the transfer thereof on the animal when present in the viscous nondispersable form. One especially preferred solvent is deodorized kerosene which, in addition to providing the necessary dissolving properties, is odorless whereby no unpleasant odors are present in the animal litter. An example of such deodorized kerosene is kerosene sold by Charter Chemicals of Charter International Oil Company, Houston, Texas under the trade name Espesol 380-66. When a solvent is used, a sufficient amount of solvent is required to dissolve the rosin oil. In the case of deodorized kerosene, for example, one may practice the invention by utilizing one part of rosin oil and one part of deodorized kerosene.

According to the present invention, the rosin oil could be used as an attractant to attract an animal to a particular location in which the attractant is present when the animal seeks a place to defecate and/or urinate. While the rosin oil could be used alone to attract the animal to a particular location, it is preferred to utilize it together with an animal litter. Any animal litter could be used for that purpose. In the case of cats, it is especially preferred that the litter be any calcined or partially calcined (heat treated or dried), sorbitive clay mineral material or mixture of material containing a sorbitive clay mineral material. An example of such cat litter is cat litter being marketed by Sanex Corporation under the trademark "BETTER WAY."

The cat litter referred to hereinabove as "BETTER WAY" is a cat litter produced from a specifically treated clay-like material that completely absorbs the cat's urine. When the cat urinates in the litter material, the urine is soaked up and chemically absorbed and/or bound (adsorbed) to the surface of the clay to form a solid ball-like mass. Accordingly, the urine ingredients do not decompose whereby the urine odor is completely neutralized. The urine balls formed are cohesive and can be lifted easily out of the litter box intact with an ordinary litter scoop along with the solid fecal material.

The amount of rosin oil used depends on the particular need and the type of animal litter being used. When one volume part of rosin oil is dissolved in 2000 parts of kerosene by volume, i.e. a dilution ratio of kerosene to rosin oil of about 2000 to 1, and the solution is placed on filter paper which serves as an inert carrier. The rosin oil so diluted is sufficient to cause cats to show noticeable preference towards filter paper with rosin oil over filter paper without rosin oil. If the dilution ratio of kerosene to rosin oil is decreased to 500 or 200, such preference does not increase noticeably. If the dilution ratio of kerosene to rosin oil is greater than 2500, the effect of the rosin oil on the cat as an attractant is not noticeable.

When cat litter comprised of the partially calcined sorbitive clay mineral material which is sold by Sanex Corporation of Houston, Tex., under the trademark "BETTER WAY", is used, about 2.5 milliliters of rosin oil per about 10 to about 15 pounds of litter are sufficient to cause the cats to prefer litter with rosin oil over litter without rosin oil. Two and one-half millilitters of rosin oil per about 10 to 15 pounds of litter is roughly equivalent to about one part of rosin oil per about 1800 to about 2800 parts of animal litter by weight. Unexpectedly and surprisingly, the preference of the cats towards the aforementioned litter which is marketed under the trademark "BETTER WAY" is significantly increased and reaches its maximum when the amount of rosin oil is in the range of about 5 to 12.5 milliliters of rosin oil per about 10 to about 15 pounds of litter. If the amount of the rosin oil is greater than that, the attracting effect of the rosin oil on the cats does not increase; on the contrary, if the amount of the rosin oil is increased to about 25 milliliters or more of rosin oil per 10 to 15 pounds of litter, the attracting effect of the rosin oil decreases and the clumping properties of the litter are adversely affected. In order to maximize the attracting effect of the rosin oil on the cats and to minimize the cost of the rosin oil used, it is preferred that about 5 milliliters of rosin oil be used with about 10 to about 15 pounds of the aforementioned partially calcined clay litter material.

As stated above, in all instances, it is preferred that, when rosin oil is used together with an animal litter, the rosin oil be diluted with an equal volumetric amount of deodorized kerosene. Therefore, in the case of the aforementioned partially calcined clay litter, 10 milliliters of attractant which is comprised of equal amounts of rosin oil and kerosene by volume mixed with about 10 to about 15 pounds of litter is the most preferred combination. When the above stated amounts of attractant mixture are used, the said attractant in combination with the litter is neither flammable nor toxic.

While a preferred embodiment of the invention has been described, modifications thereof can be made by one skilled in the art without departing from the spirit of the invention.

What we claim is:

1. An animal litter capable of attracting animals, comprising:
    litter material; and
    a rosin oil, the amount of the rosin oil being one part of rosin oil per 900 to 1400 parts of animal litter by weight.

2. A method of attracting an animal to a particular location, comprising:
    placing a rosin oil on the location; and
    exposing the animal to the odor of the rosin oil.

3. A method according to claim 2 wherein the rosin oil is obtained from the dry distillation of rosin.

4. A method according to claim 2 wherein the rosin oil is rosin oil which is also used in lithographic and printing applications.

5. A method according to claim 2 wherein the rosin oil is placed on the location with an animal litter.

6. A method according to claim 5 wherein one part of the rosin oil is used with 900 to 1400 parts of the animal litter.

7. A method of attracting an animal to a particular location, comprising:
    placing on the location a rosin oil which contains decarboxylated abietic acid; and
    exposing the animal to the odor of the rosin oil.

8. An animal litter capable of attracting animals, comprising:
    a litter material; and
    a rosin oil, the amount of the rosin oil being in the range of about 5.0 to about 12.5 milliliters of rosin oil per about 10 to about 15 pounds of the litter material.

9. An animal litter according to claim 8 wherein the amount of the rosin oil is about 5.0 milliliters of rosin oil per about 10 to about 15 pounds of the litter material.

10. An animal litter according to claim 8 wherein the rosin oil is obtained from the dry distillation of rosin.

11. An animal litter according to claim 10 wherein the rosin oil is material used in lithographic and printing application.

12. An animal litter according to claim 8 wherein the rosin oil contains decarboxylated abietic acid.

13. An animal litter according to claim 8 wherein the rosin oil contains abietic acid.

14. An animal litter according to claim 8 further including an organic solvent in which the rosin oil is dissolved to make the rosin oil less viscous.

15. An animal litter according to claim 14 wherein the solvent is kerosene.

16. An animal litter according to claim 15 wherein the animal litter contains about equal amounts of rosin oil and kerosene by volume.

17. A method of attracting an animal to a litter material, comprising:
    mixing a rosin oil with the litter material; and
    exposing the animal to the odor of the rosin oil, the amount of the rosin oil being in the range of about 5.0 to about 12.5 milliliters of rosin oil per about 10 to about 15 pounds of litter material.

18. A method according to claim 17 wherein the rosin oil is obtained from the dry distillation of rosin.

19. A method according to claim 17 wherein the amount of rosin oil is about 5.0 milliliters of rosin oil per about 10 to about 15 pounds of litter material.

20. A method according to claim 17 wherein the rosin oil contains decarboxylated abietic acid.

21. A method according to claim 17 wherein the rosin oil contains abietic acid.

* * * * *